United States Patent [19]

Jánosi

[11] 4,348,703
[45] Sep. 7, 1982

[54] FLEXIBLE MAGNETIC DISC HAVING TRACK MARKING INFORMATION RECORDED THEREON

[75] Inventor: Marcell Jánosi, Budapest, Hungary

[73] Assignee: Budapesti Rádiótechnikai Gyár, Hungary

[21] Appl. No.: 136,560

[22] Filed: Apr. 2, 1980

[30] Foreign Application Priority Data

May 6, 1979 [HU] Hungary .............................. BU 937

[51] Int. Cl.$^3$ ............................................. G11B 21/10
[52] U.S. Cl. ..................................... 360/77; 360/109
[58] Field of Search .................................. 360/77–78, 360/106, 109, 135, 76, 70, 75

[56] References Cited

U.S. PATENT DOCUMENTS

| | | | |
|---|---|---|---|
| 3,404,392 | 10/1968 | Sordello | 360/77 |
| 3,479,664 | 11/1969 | Stuart-Williams et al. | 360/77 |
| 3,593,333 | 7/1971 | Oswald | 360/77 |
| 3,840,893 | 10/1974 | Jacoby et al. | 360/77 |
| 3,864,740 | 2/1975 | Sordello et al. | 360/77 |
| 3,924,268 | 12/1975 | McIntosh et al. | 360/77 |

OTHER PUBLICATIONS

IBM/TDB, vol. 23, No. 1, Jun. '80, pp. 304–305, "Pattern for Buried Servo", by Howell.
IBM/TDB, vol. 23, No. 3, Aug. '80, pp. 1203–1210, "Improvement in the Positioning Error . . . ", by Handen et al.

*Primary Examiner*—John H. Wolff
*Attorney, Agent, or Firm*—McGlew and Tuttle

[57] ABSTRACT

A method for recording track marking information on flexible magnetical information carrier discs, in which the circular tracks on one side of the disc are each divided into an information recording segment having an angular width of at least 270° and a remaining track marking segment, and in this latter respective marking frequency signals are recorded so that each of these signal is distinguishable from those recorded on the two neighboring tracks.

The invention relates to an apparatus for fine adjustment of the position of a reading head in case of discs recorded by the above method. The apparatus comprises frequency selective means that selects the marking frequency components when track marking segments are played back. The difference of the sensed components are processed to a control signal which drives a control unit for adjusting the radial position of the head to the center line of a predetermined track. The invention is sensitive against excentricities of the track and it ensures almost a double storage capacity compared to conventional floppy discs, or it uses simple playback systems in which double head movement is not required.

4 Claims, 4 Drawing Figures

FLEXIBLE MAGNETIC DISC HAVING TRACK MARKING INFORMATION RECORDED THEREON

BACKGROUND OF THE INVENTION

The present invention relates to a method for recording track marking information on flexible magnetical information carrier discs and to an apparatus for fine adjustment of the position of a reading head.

The method and apparatus according to the invention is generally applicable in mini-floppy and micro-floppy information recording systems, or in casette-systems with flexible magnetical discs, in which the eccentricity of the concentrical recording tracks is smaller than the permissible track adjusting error. The present invention facilitates the adjustment of the reading head to the information carrying tracks.

In the field of floppy technique the positioning and retrieval of circular information recording tracks is solved in such a way that concentrical and circular guiding tracks are recorded on the rear side of the circular information recording disc with an appropriate track density, e.g. 500 tracks per inch. The information recording occurs in the first side of the disc during the reading of the corresponding rear guiding tracks, and a suitable servo-mechanical system controls the position of the reading-writing head in accordance with the guiding track. The guiding tracks are used in the same way when information is read out from the disc.

In this conventional head-adjusting system a first disadvantage lies in that a complete side of the disc is not used for recording useful information but only for track-guiding. A further drawback lies in that simultaneously at both sides of the disc respective writing-reading heads should be moved. The two heads are separated by the rotating disc lying therebetween, and a precisely adjustable mechanical link must be provided between the heads which must keep the relative position of the heads unchanged during adjustments.

Such a double-sided access to the disc and the simultaneous precise adjustment of the heads raises increased difficulties in case of magnetical information recording discs placed in respective casette casings because the presence of the closed casette renders the double-sided disc access to be difficult. Apart from a number of advantages such information recording magnetical casette disc systems have not gained wide acceptance, mostly due to the problems connected with track guiding.

It is an apparent advantage of the aforesaid conventional systems using guiding tracks that its track control can compensate the accuracy errors originating from the eccentricity of the circular tracks and from the thermal deformation of the disc.

SUMMARY OF THE INVENTION

The object of the present invention is to provide a method and an apparatus that enables the solution of the task of track guiding in case of a single-sided disc access, in which there is no need of using two separate heads and in which both sides of the disc can be used for recording useful information.

The above object is attained by such a method in which conventional information recording occurs in information storage sectors of circular tracks of flexible magnetical information carrier discs rotated with predetermined operational speed, in which the width of the information storage sectors is at least about 330°, and in the remaining track marking sectors of each of the tracks marking frequencies are recorded so that each marking frequency is distinguishable from the marking frequency recorded in the two adjacent tracks.

In a preferable embodiment of the method according to the invention in each even-numbered track a first common marking frequency and in each odd-numbered track a second common marking frequency is recorded which latter is different from the first one.

According to a second aspect of the present invention the position of a reading head associated with a flexible magnetical information carrier disc is adjusted finely to the circular information recording tracks of the disc by means of an apparatus that comprises a circuit being selective to marking frequencies recorded in track marking sectors of the disc having an angular width of maximum about 30°, the circuit provides an output signal proportional to the amplitudes of the marking frequencies read out by the reading head, and a control unit which in response to the output signals of the selective circuit controls the output signal corresponding to a predetermined track to reach a maximum by adjusting the radial position of the reading head.

The selective circuit of the apparatus according to the invention comprises a first selector that selects the first marking frequency component from the playback signal of the reading head and provides a direct current output signal proportional to the amplitude of this component, a second selector that selects the second marking frequency component from the playback signal of the reading head and provides a direct current output signal proportional to the amplitude of this second component, a first differential amplifier having a pair of inputs coupled to the outputs of the first and second selectors and provides an output voltage representing the difference of the two direct current input voltages.

The control unit of the apparatus according to the invention comprises preferably a second differential amplifier having a first input coupled to the output of the first differential amplifier, a reference signal forming unit having an output connected to the second input of the second differential amplifier and supplies a reference voltage associated with the predetermined track to which adjustment should be made, and an adjusting means which, depending on the output signal of the second differential amplifier, adjusts the radial position of the reading head.

When using the method according to the invention, the presence of the track marking sectors with an angular width falling between about 15° and 30° takes some percent of the useful information recording area, but the corresponding losses are compensated by the fact that the rear side of the disc will be free for information recording and only a single head is required which substantially simplifies the constructional design.

The invention will now be described in connection with some preferable embodiments, in which reference will be made to the accompanying drawings.

DESCRIPTION OF THE PREFERRED EMBODIMENTS

Figure 1:
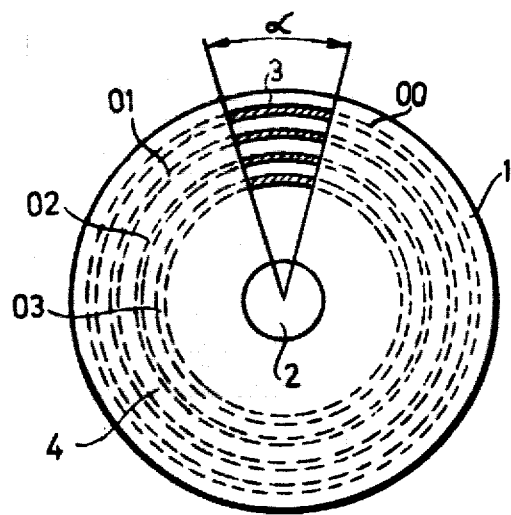
FIG. 1 shows the schematical top view of a flexible magnetical information recording disc with tracks of enlarged width.

FIG. 1 shows an information recording disc 1 of magnetical material, which is similar to the discs used in mini-floppy systems. The accurate central mounting of the disc 1 is provided by means of its central bore 2. There are circular information recording tracks on the disc 1, and of these four neighbouring tracks 00, 01, 02 and 03 are illustrated in an enlarged scale in FIG. 1. In each track there is provided a track marking sector 3 having an angular width $\alpha$ for recording a suitable marking frequency signal as it will be explained later. Within certain constructional limits the value of the angle $\alpha$ can be chosen optionally, and this value falls preferably between 15° and 30°. The remaining information carrying sectors 4 of the tracks, shown with dashed lines in FIG. 1, comprise useful information recorded in the form of binary ones and zeros.

The role of the marking frequencies recorded in the track marking sectors is to distinguish any particular track from the adjacent ones. If a respective common marking frequency is recorded in the track marking sectors 3 of every second track, then the above condition is satisfied because it will be valid for any track that the marking frequency recorded on the two neighbouring tracks will be different from that of the particular track in question. Taking into account that in the information carrying sectors the recorded information is a sequence of frequency signals representing the bits "1" and "0", respectively, it will be preferable to use the same frequency signals as marking frequency signals. For example, in that case the marking frequency recorded on each track with even track number as counted from the perimeter towards the center, can correspond to the frequency of the bits "0", and that which is recorded on each track with odd track number can correspond to the frequency of the bits "1", or vice-versa.

Figure 2:
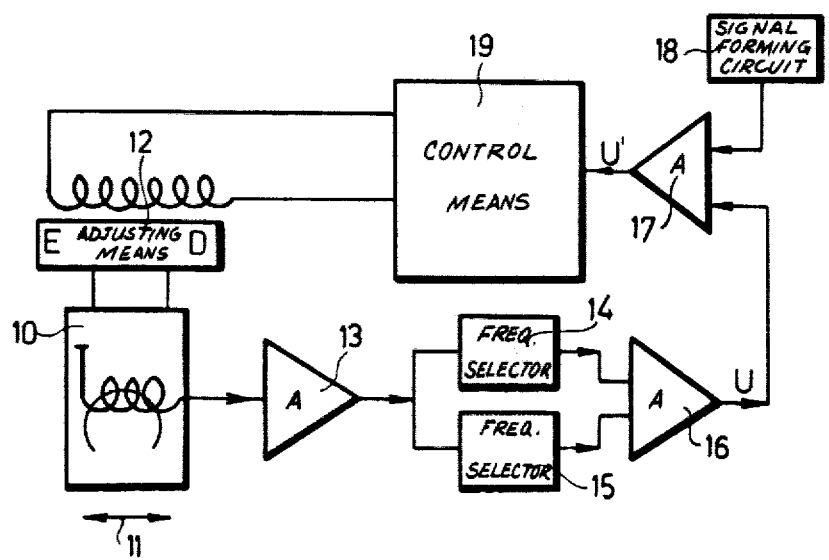
FIG. 2 shows the block diagram of a preferred embodiment of the apparatus according to the invention with schematically illustrated enlarged tracks in front of the reading head.
Figure 2:
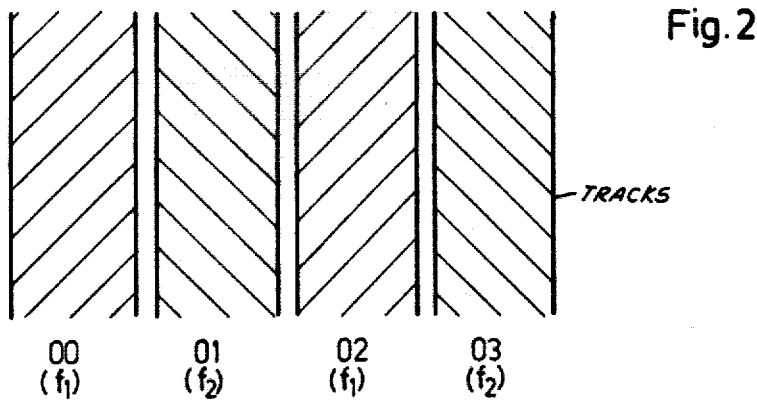

Referring now to FIG. 2 showing a reading head 10 which is located in front, or above, of the tracks 00, 01, 02 and 03 shown in an enlarged scale, and the head 10 is precisely adjustable along arrow 11 designating the radial direction of the disc 1. The reading head 10 is generally a combined reading-writing head. A precise position adjusting means 12 is shown that adjusts the radial position of the head 10. It has not been illustrated but it is widely known that the coarse position adjustment of the head is provided by a separate head positioning assembly, with an adjusting accuracy of about 0.5–0.75 track width, and the precise position adjusting means 12 is capable of adjusting the position of the head relative to that assembly.

The output of the reading head 10 is coupled to a reading amplifier 13 and the output of this latter is connected to the input of a selective circuit consisting of a first frequency selector 14 and of a second frequency selector 15. The first frequency selector 14 is selective to the first marking frequency component of the read out signal and it provides an output direct current signal having a voltage corresponding to the amplitude of the first marking frequency component. The second frequency selector 15 has a similar design, but it is selective to the second marking frequency components. The outputs of the first and second frequency selectors 14 and 15 are coupled to respective inputs of a first differential amplifier 16, the output of which being connected to a first input of a second differential amplifier 17. The second differential amplifier 17 has a second input and it is connected to a reference signal forming circuit 18 that supplies a direct current reference level to the second differential amplifier 18 associated with the actual marking frequency of the particular track to which adjustment should be made.

The output of the second differential amplifier 18 is coupled to a control amplifier 19, which in response to its input signal provides a sufficiently amplified driving signal with appropriate sign for the precise position adjusting means 12.

The operation of the apparatus shown in FIG. 2 is as follows. In the position shown in the drawing the reading head 10 permanently receives the first and second marking frequencies when it is opposite to the track marking sector 3 of the disc 1. Supposing that the reading head 10 is closer to the track 01 than to the adjacent track 00, the signals recorded with the second marking frequency $f_2$ generate a higher voltage in the head than the signals of the first marking frequency $f_1$. The first and second frequency selectors 14 and 15, comprising both a tuned band amplifier and a rectifier, provide direct current voltage signals at their outputs that correspond to the respective marking frequency components. The two inputs of the first differential amplifier 16 are driven by voltages $|U_{f1}|$ and $|U_{f2}|$, wherein $|U_{f1}|$ designates the absolute value of the first marking frequency component $f_1$, and $|U_{f2}|$ designates the absolute value of the second marking frequency component $f_2$.

The voltage U on the output of the differential amplifier 16 is the difference of the above two signals:

$$U = |U_{f1}| - |U_{f2}|.$$

Figure 3:
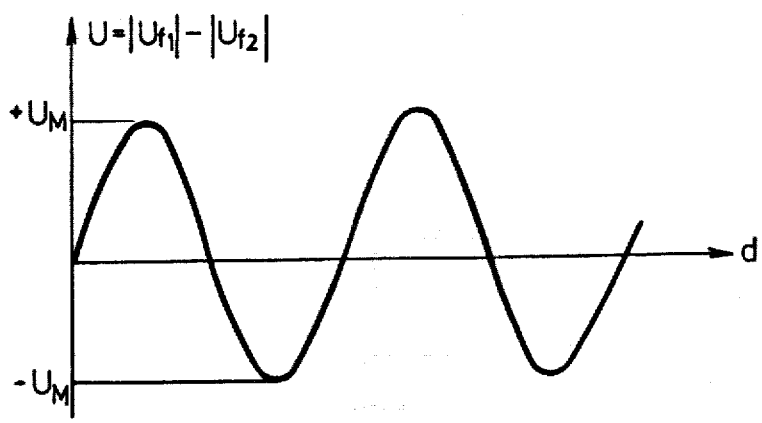
FIG. 3 shows the output voltage of the first differential amplifier of FIG. 2 as a function of the radial displacement of the head.

FIG. 3 shows the curve of the voltage U as a function of the radial displacement d of the reading head 10. It can be seen that when the reading head 10 is in positions opposite to the even-numbered tracks 00 and 02, then the value of the voltage U is at a positive maximum $+U_M$. When the reading head is in positions opposite to the odd-numbered tracks 01 and 03, then the voltage U will be at negative maximums $-U_M$.

Depending on the particular track to which the adjustment of the reading head 10 should be made, the reference signal forming unit 18 supplies a reference signal of $+U_M$ or $-U_M$ to the second input of the second differential amplifier 17. In the example illustrated in FIG. 2 the position of the reading head 10 should be adjusted to the second track 01. For such an adjustment a reference voltage of $-U_M$ should be provided for the second differential amplifier 17. Depending on the difference between the actual voltage U and the preset reference value $-U_M$, the control amplifier 19 will provide a driving voltage to the precise position adjusting means 12. Obviously, this latter will change the radial position of the reading head 10 until it will be just opposite to the centre of the track 01. In this position the control voltage will be zero. The control amplifier 19 comprises an appropriate differentiating member which senses the sign i.e. direction, of the control process. When the control occurs with a correct sign, the control voltage should be of decreasing character in time. When the differentiating member senses a sign that would move the reading head 10 away from the correct position instead of towards to it, then it activates an appropriate switch for changing the sign of the output voltage of the control amplifier 19.

The control process according to the invention is sufficiently effective to bring the reading head 10 into the correct position relative to the required track during the period in which the reading head 10 reads the track marking sector 3.

The above described arrangement is therefore capable of positioning the reading head following a preliminary coarse adjustment.

Now the technical limits of the proposed way of head adjustment will be analyzed from which the track density can be determined.

The above described control system cannot offer protection against the deviations of the information carrying tracks on the disc 1 from the idealistic geometrically circular path, because the control is carried out only in a small sector of the whole path. Any eccentricity of the tracks results in an inaccurate positioning (offset) of the reading head relative to the centre of the track. Such excentricity error may arise:

a. from the eccentricity of the driving shaft (not shown in the drawing) that drives the disc 1;
b. from the eccentricity of the central bore 2 of the disc 1; and
c. from the eccentricity caused by the non-even thermical dilatation of the disc when unevenly distributed heat is applied to the disc.

When the maximum permitted eccentricity is arbitrarily chosen to a value corresponding to about 15% of the radial distance (spacing) between adjacent tracks, then this amount of excentricity cannot cause noticeable playback or recording errors. Practical tests have shown that with accuracies or tolerance ranges used widely in the field of mini-floppy technique the maximum value of the expectable eccentricity is about 12.6 $\mu$m if the corresponding diameter of the disc is 120 mm and that of the bore 2 is 28 mm.

With such conditions the maximum track density is 302 tracks per inch.

Figure 4:
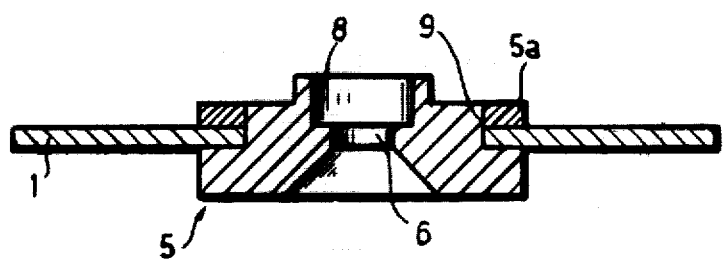
FIG. 4 shows the sectional elevational view of a hub disc for centrally fixing the flexible magnetical disc.

The eccentricity can be reduced substantially by using discs provided with solid centering hubs. FIG. 4 shows such a disc construction. The disc comprises a central disc-shaped hub 5 made of a firm plastic material in which a central guiding bore 6 is tooled with very small tolerances. The bore 6 communicates at its first side with a conical inlet opening 7 and at its other side with a bore 8 of larger diameter. A cylindrical outer surface 9 of the central hub 5 coaxially guides the mounting bore 2 of the disc 1. A clamping ring 5a closely fits to the cylindrical outer surface 9, whereby it keeps the disc 1 in engagement with the central hub 5.

The tests for eccentricity have shown that in case of the construction shown in FIG. 4 with an outer disc diameter of 68 mm and with a central bore 2 diameter of 2 mm, the eccentricity was better than 6.8 $\mu$m. With this eccentricity the realizable track density reaches the value of 560 tracks per inch.

By using the present invention the marking information and the useful information can be recorded in one side of the disc, which results in an information storage loss ranging between about 4% and 8%, but it enables the usage of an inexpensive system with a single head in combination with a cheaper only on one side recordable disc-type. In case of using a double-sided information recording system, the present invention provides almost a double information storage capacity compared to conventional systems. The above described realizable tracking density values show that the usual tracking densities used in mini-floppy technique can be used with the present invention, too.

What is claimed is:

1. An apparatus for fine adjustment of the position of a reading head associated with a flexible magnetic information carrier disc relative to the circular information recording tracks of the disc, in which each of said tracks comprise an information sector and a track-marking sector each track-marking sector having at most about 30° angular width of the respective track, and on every track-marking sector a marking frequency being recorded with a frequency value being distinguishable from the marking frequency recorded on the neighbouring tracks, said apparatus comprising circuit means selective to said marking frequencies and coupled to said reading head for providing an output signal proportional to the amplitudes of the marking frequency components of signals read out by said reading head, and a control unit which in response to said output signal adjusts the radial position of said reading head to control that component of said output signal to a maximum which is associated with said frequency value of the track to which fine adjustment should be made, wherein the tracks with even track numbers comprise a first marking frequency value, and the tracks with odd track numbers comprise a second marking frequency value, and wherein said first and second marking frequency values correspond respectively to frequencies represented by the "0" bits and "1" bits recorded in the information carrying sector of said tracks.

2. The apparatus as claimed in claim 1, in which said selective circuit comprising a first frequency selector for selecting a first component of said read out signal having said first marking frequency to provide a first direct current signal being proportional to the amplitude of said first component, a second frequency selector for selecting a second component of said read out signal having said second marking frequency to provide a second direct current signal being proportional to the amplitude of said second component, and a first differential amplifier having a pair of inputs coupled to the outputs of said selectors and an output providing a voltage signal representing the difference of said first and second direct current signals.

3. The apparatus as claimed in claim 4, in which said control unit comprising a second differential amplifier having a first input coupled to the output of said first differential amplifier, a reference signal forming means having an output coupled to a second input of said second differential amplifier to provide a reference voltage associated with the track to which said reading head is to be adjusted, and a positioning means for adjusting the radial position of said reading head corresponding to the sign and magnitude of the output signal of said second differential amplifier.

4. The apparatus as claimed in claim 3, in which said reading head is a combined recording and reading head.

* * * * *